(12) United States Patent
Bruenle

(10) Patent No.: US 6,445,689 B2
(45) Date of Patent: *Sep. 3, 2002

(54) DEVICE FOR A RADIO-COMMUNICATION SYSTEM, IN PARTICULAR FOR POINT-TO-MULTIPOINT CONNECTIONS

(75) Inventor: Siegfried Bruenle, Allmersbach (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,640

(22) Filed: Jan. 23, 1998

(30) Foreign Application Priority Data

Jan. 23, 1997 (DE) .......................... 197 02 028

(51) Int. Cl.[7] .......................... H04Q 7/24; H04L 12/28; H04J 3/18; H04B 1/38
(52) U.S. Cl. .................. 370/336; 370/338; 370/395; 370/477; 455/452; 455/554
(58) Field of Search ................. 370/336, 337, 370/338, 395, 486, 362, 375, 474, 442, 443, 473; 455/10, 76, 71, 53.1

(56) References Cited

U.S. PATENT DOCUMENTS

| | | | | | |
|---|---|---|---|---|---|
| 5,535,207 | A | * | 7/1996 | Dupont | 370/80 |
| 5,541,915 | A | * | 7/1996 | Storm | 370/60.1 |
| 5,648,962 | A | * | 7/1997 | Pirinen | 370/338 |
| 5,761,197 | A | * | 6/1998 | Takefman | 370/337 |
| 5,794,119 | A | * | 8/1998 | Evans et al. | 455/6.2 |
| 5,805,591 | A | * | 9/1998 | Naboulsi et al. | 370/395 |
| 5,844,906 | A | * | 12/1998 | Khelghatti et al. | 370/474 |
| 5,898,697 | A | * | 4/1999 | Hurme et al. | 370/508 |
| 6,178,330 | B1 | * | 1/2001 | Alberty et al. | 455/452 |

FOREIGN PATENT DOCUMENTS

| | | |
|---|---|---|
| DE | 44 26 183 | 10/1995 |
| DE | 196 35 533 | 10/1997 |

\* cited by examiner

Primary Examiner—Wellington Chin
Assistant Examiner—M. Phan
(74) Attorney, Agent, or Firm—Kenyon & Kenyon

(57) ABSTRACT

A device for a radio-communication system, in particular for point-to-multipoint connections, includes components for a supplementary transmission of ATM cells and for dynamically assigning the transmission capacity as a function of the traffic intensity.

31 Claims, 2 Drawing Sheets

DEVICE FOR A RADIO-COMMUNICATION SYSTEM, IN PARTICULAR FOR POINT-TO-MULTIPOINT CONNECTIONS

FIELD OF THE INVENTION

The present invention relates to a device for a radio-communication system, in particular for point-to-multipoint connections between a central station and radio-communication subscribers, the transmission being carried out in a radio frame by means of time slots which represent multiples of a basic bit rate.

BACKGROUND INFORMATION

German Patent No. 44 26 183 describes a radio relay system for point-to-multipoint connections in which the frequency channels available for communication between a central station and multiple subscribers can be assigned as needed. The bandwidth of the individual frequency channels can be adjusted to conform to the data transmission rates required by each of the individual subscribers. This system permits a flexible transmission capacity, adjusted to the needs of the subscribers.

SUMMARY OF THE INVENTION

The device according to the present invention expands a radio-communication system which is based on time slot transmission, in particular a radio-communication system based on n*64 kbit/s for the transmission of packet- or cell-oriented data, i.e., services such as ATM cells, the flexible assignment of transmission capacity being ensured both for a time slot transmission with, for example, n*64 kbit/s-time slots, and for packet- or cell-oriented data. The present invention permits the utilization of the compression capacity of ATMs, also in a connection network, having in particular, point-to-multipoint connections. The device according to the present invention is well suited for use in telecommuting workplaces where transmission capacities need to be flexibly assigned.

DETAILED DESCRIPTION

Figure 1:
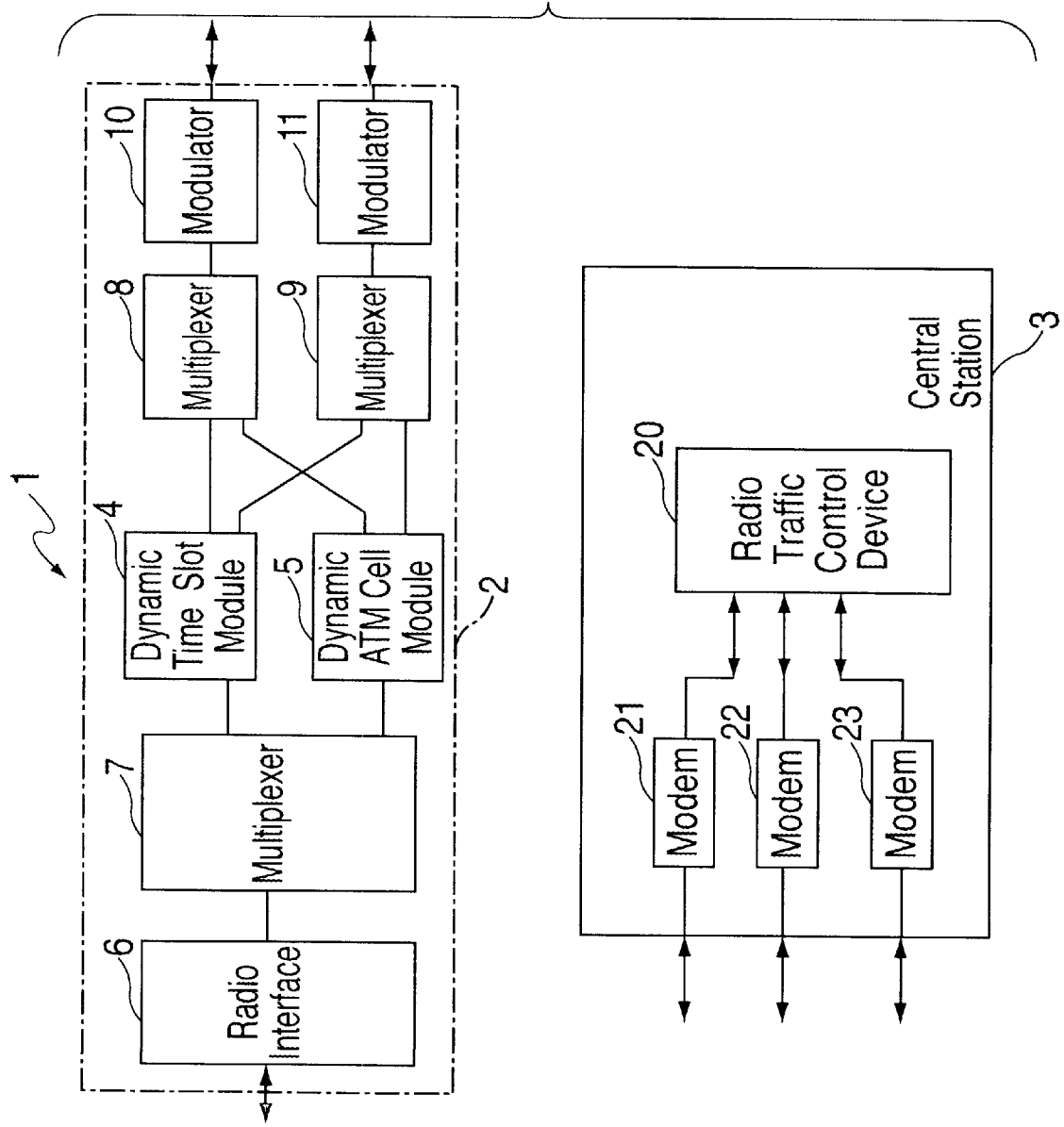
FIG. 1 shows a block diagram of a modem for transmitting time slots and ATM cells.

FIG. 1 illustrates a radio-communication subscriber 1 having a modem 2 of a device for a radio-communication system, in particular for point-to-multipoint connections. Both central station 3 and individual radio-communication subscribers 1, which can be individual or PBX lines, have such modems. Central station 3 has as many modems 21, 22, 23, connected in parallel, as the number of radio-communication subscribers that, at a maximum, can establish a radio link with central station 3. The point-to-multipoint radio-communication system utilized here is based on the transmission of n*64 kbit/s-time slots in a radio frame of, e.g., 2 mbit/s, i.e., 32*64 kbit/s. The time slots are chosen in such a way that they represent multiples of the basic bit rate, 64 kbit/s. By means of DBA (Dynamic Bandwidth Allocation), it is only the active time slots that are thereby transferred. In addition to the DBA compression function of the n*64 kbit/s time slots, a similar DBA compression function is also provided for packet- or cell-oriented services, e.g., the ATM cells. In one transmission system, there can either be one of the DBA compression functions singly or, on the other hand, both compression functions in parallel, as the exemplary embodiment in FIG. 1 shows.

The variation of the transmission capacity for a dynamic assignment, i.e., one that is changeable during an existing radio link, especially of the bit rate, on a radio propagation path between radio-communication subscribers and central station 3 is controlled by measuring the traffic intensity, which is able to be determined from the number of data packets or, e.g., of ATM cells and/or time slots received during a prescribed time period. Modem 2 has two external interfaces, for example, for 1*2 mbit/s for n*64 kbit-time slots and 1*10 mbit/s for ATM cells. Alternatively, as shown in FIG. 1, only one interface block 6 can be provided for a compressed time-slot-ATM transmission signal of 1*12 mbit/s. A multiplexer 7 separates the signal arriving from radio interface 6 into the data streams n*64 kbit/s and ATM. In the return direction, a multiplexer compresses both incoming signals into a data stream. The time slot-ATM signals, which have been separated from each other, are each fed to a module 4 or 5, in which the dynamic bit rate assignment for the time slot or ATM data stream is performed. The two outputs of modules 4 and 5 are compressed in two multiplexers 8 and 9 through direct and crossover coupling, as shown in FIG. 1. A modulator 10 or 11 is provided at the output of each of these multiplexers for editing the transmission signals in question and for translating them into the radio-frequency position. In the return direction (direction of reception), multiplexers 8 and 9 separate the signal arriving from a modulator into the data streams n*64 kbit/s and ATM.

Figure 2:
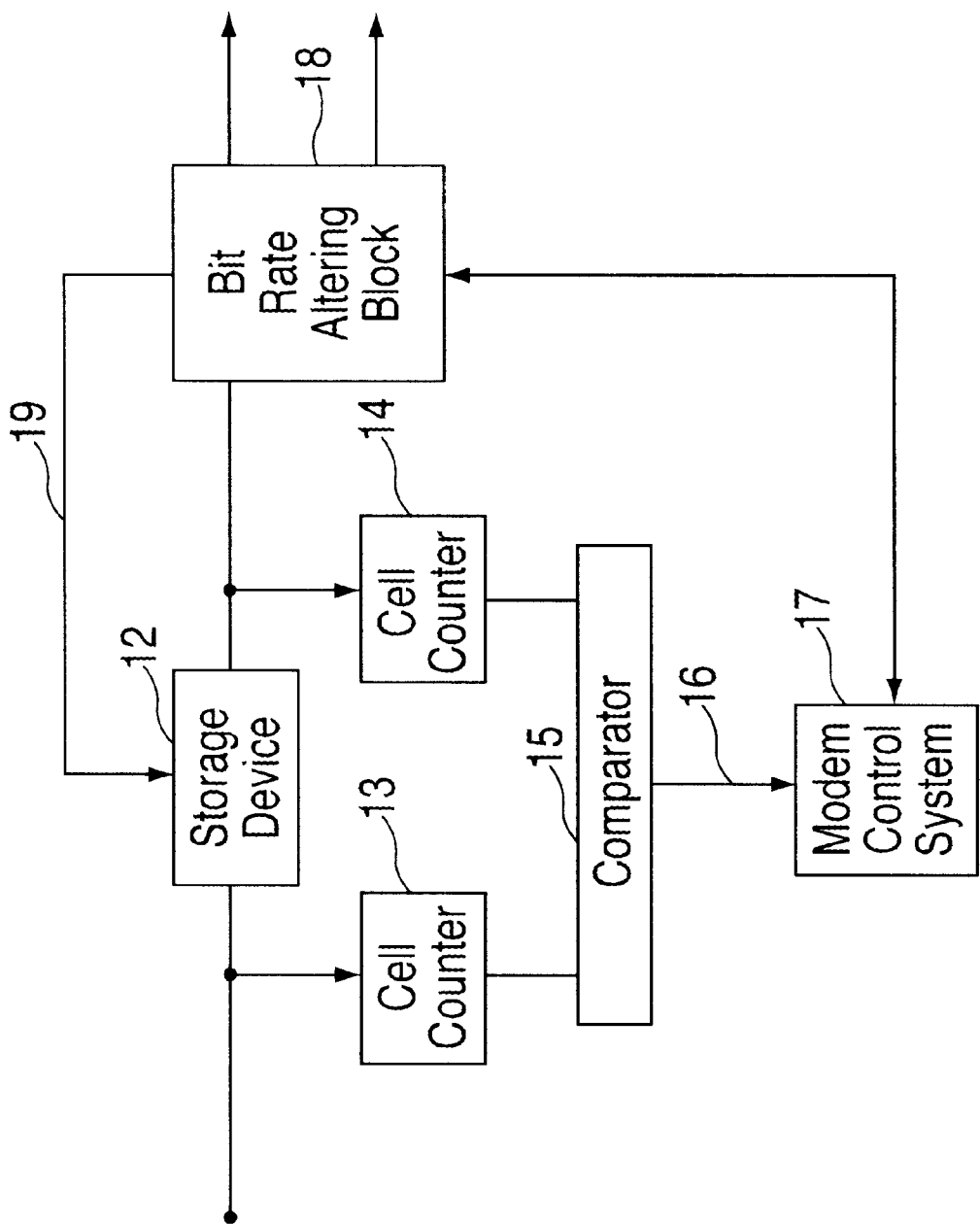
FIG. 2 shows a device for dynamically increasing the bit rate for ATM cells.

The design of module 5, i.e., of the module for recording and evaluating ATM cells, is depicted in detail in FIG. 2. The ATM cells received from interface 6 are written into a storage device 12, and the filling level of this storage device 12 is determined. For this purpose, provision is made for a cell counter 13 or 14 at the input and output, respectively, of the storage device. A comparator device 15 for the counter readings is used to determine whether the bit rate should be raised. If the number of ATM cells received per period of time is greater than the number of ATM cells transmittable at the radio interface, a threshold value of comparator device 15 is exceeded, and a REQUEST signal 16 for increasing the bit rate is sent to modem control system 17. This modem control system 17 communicates with radio traffic control device 20 of central station 3 via control cells and/or radio multiframes. Block 18, for altering the bit rate, increases or decreases the bit rate by the quantity given by modem control device 17. In addition, the block synchronizes the read-out of storage device 12 over control line 19 adjusted to the set bit rate. Moreover, from the control information from modem control unit 17, block 18 generates control cells which are mixed into the ATM data stream and controls the DBA function, i.e., achieves a switch-over free of bit errors.

A comparable evaluation of the time slots can be performed in module 4. It is here, in conformance with the time slot evaluation, that more or fewer time slots and/or transmission channels are allotted via the modem control unit.

Since with ATMs various classes of services are provided, e.g., time-critical services such as POTS, ISDN, or video transmission with synchronous information, and also non-time-critical services such as data transmission, various transmission concepts are employed.

For time-critical services, a basic channel between a radio-communications subscriber 1 and central station 3 is always available. The transmission capacity, i.e., the bit rate or bandwidth of this basic channel, is determined by the time requirements, synchronicity, and number of necessary control cells. If necessary, the bit rate of a basic channel can be increased.

When a basic channel is used, it is of no importance that the synchronization for increasing the bandwidth lasts, for example, 300 ms, because time-critical cells can be immediately sent over the basic channel.

For non-time-critical services, between the radio-communication subscribers and the central station, a small basic channel for control cells can always be available, whose bit rate can be increased, as needed. Alternatively, i.e., in the absence of a basic channel, the bandwidth request can be carried out over a radio-communication multiframe. The increase of the bit rate can be executed as follows: the receiver determines on a modem 2 that the number of ATM cells received is greater than the number of ATM cells transmittable at the radio interface over the basic channel. The receiver sends a request signal REQUEST via a control cell or a radio-communication multiframe to radio traffic control device RASCO (Radio System Controller) 20 of central station 3, requesting a higher bit rate. Since similar REQUESTs can arrive simultaneously from a plurality of receivers, the RASCO processes these REQUESTs with the help of a collision protocol and, if indicated, increases the bandwidth on a link. The increased bandwidth is retained
  either for a predetermined time (e.g., maximally 500 ms)
    or until the capacity of the basic channel by itself is again sufficient,
    or until the RASCO cancels the increase (e.g., so that higher priority links are able to send cells).

As the exemplary embodiment of FIG. 1 shows, in each modem there are two sending and two receiving channels, each of which is supplied by modules 4 and 5, by means of the direct and crosswise coupling. Signal transmission is always carried out only in one transmitting and one receiving channel; the other transmitting and receiving channel is not active then. When control device 17 receives a request for a change in the transmission rate and it thereupon recalculates the transmission parameters in accordance therewith, it transmits its new transmission parameters as control signals to the relevant switching blocks of the transmitting/receiving channel not in operation. As soon as the new transmission parameters have been set in the relevant modems 21, 22, 23 of the central station, and the radio subscribers have also confirmed at control device 20 the acquisition of the new transmission parameters via the signaling channel (basic channel or radio-communication multiframe), signal transmission and processing in all the modems concerned are continued in the other signal path, where the conversion to the altered transmission parameters is made. Therefore, when a change in the transmission parameters is necessary, for example because one or more supplementary transmission channels or increased bit rates are requested, or there is a different requirement for frequency bands or bit rates, the signal transmission is continued with the old transmission parameters until the new transmission parameters have been set in the as yet inactivated transmitting/receiving channel, and the switchover to this channel will take place only when the transmission is secured (setup before brake). In this way, disruptive interruptions in signal transmission are avoided.

Further details on this subject as well as generally on the assignment of bandwidths during a radio link can be found, for example, in German Patent Application No. 196 12 107.8.

What is claimed is:

1. A device for a radio-communication system, a transmission being carried out in a radio-communication frame using time slots, the time slots representing multiples of a basic bit rate, the device comprising:
  means for providing a supplemental transmission of at least one of packet-oriented data and cell-oriented data; and
  means for dynamically assigning a transmission capacity as a function of at least one of a traffic intensity in the transmitted time slots and a number of data packets or cells, the dynamic assignment being an assignment that is changeable during an existing radio link.

2. The device according to claim 1, wherein the system includes point-to-multipoint connections between a central station and radio-communications subscribers.

3. A device for a radio-communication system, a transmission being carried out in a radio-communication frame using time slots, the time slots representing multiples of a basic bit rate, the device comprising:
  means for providing a supplemental transmission of at least one of packet-oriented data and cell-oriented data; and
  means for dynamically assigning a transmission capacity as a function of at least one of a traffic intensity in the transmitted time slots and a number of data packets or cells, the dynamic assignment being an assignment that is changeable during an existing radio link;
  wherein a module for recording and evaluating the data packets or cells, within a prescribed time period, and for outputting a request signal to increase the transmission capacity when a number of the data packets per time period exceeds a threshold value, is assigned to a radio-communication subscriber.

4. The device according to claim 1, wherein, in order to change the transmission capacity, at least one of the bit rate and a bandwidth of a transmitter of a radio-communication subscriber is switchable.

5. The device according to claim 1, further comprising a multiplexer for separating a signal supplied by a radio interface of a radio-communication subscriber into data streams for the transmission of the time slots and of ATM cells, and for, in a return direction, compressing into one data stream the data streams sent by the radio-communication subscriber for the transmission of the time slots and the transmission of the ATM cells.

6. The device according to claim 1, wherein a basic channel for control cells requests the transmission capacity between a radio-communication subscriber and a central station.

7. The device according to claim 1, wherein a radio-communication multiframe requests the transmission capacity between a radio-communication subscriber and a central station.

8. A device for a radio-communication system, a transmission being carried out in a radio-communication frame using time slots, the time slots representing multiples of a basic bit rate, the device comprising:
  means for providing a supplemental transmission of at least one of packet-oriented data and cell-oriented data; and
  means for dynamically assigning a transmission capacity as a function of at least one of a traffic intensity in the transmitted time slots and a number of data packets or cells, the dynamic assignment being an assignment that is changeable during an existing radio link;

wherein each of a plurality of radio-communication subscribers is assigned one modem with two transmitting and two receiving channels, a signal transmission in the modem being carried out on only one of the two transmitting/receiving channels, wherein, in response to a change in the transmission capacity based on a request signal, another one of the two transmitting/receiving channels not currently in operation undertakes an acquisition of a new transmission capacity, while the transmission in the one transmitting/receiving channel in use is continued until, after a completed acquisition, a switch-over free of bit errors is made to the another one transmitting/receiving channel not in use.

9. The device according to claim 8, wherein the modem has devices for dynamically assigning the transmission capacity, both for the time slots and for ATM cells.

10. The device according to claim 9, wherein the devices are connected in each case, on an output side, to an input of a first and second multiplexer such that, with each of the first and second multiplexers, the time slots and the ATM cells are compressed into one data stream and are separated, in a return direction, into the time slots and the ATM cells.

11. The device according to claim 1, wherein, to evaluate ATM cells, the means for dynamically assigning includes:
   a storage device for storing the ATM cells;
   a cell counter for the ATM cells at both an input and an output of the storage device;
   a comparator device coupled to the cell counter; and
   a modem control device which, as a function of an output of the comparator device, directs a control signal to a device for altering the bit rate.

12. The device according to claim 11, wherein the output of the storage device is synchronized by the device for altering the bit rate.

13. The device according to claim 11, wherein, in order to transmit a request signal for a higher transmission capacity, the modem control device communicates with a central station via a radio-communication channel.

14. The device according to claim 13, wherein the central station includes means for processing the request signal of each of a plurality of radio-communication subscribers using a collision protocol.

15. The device according to claim 14, further comprising means for maintaining an assigned increased transmission capacity for a set time period.

16. The device according to claim 14, further comprising means for maintaining an assigned increased transmission capacity until the transmission capacity of a basic channel is again sufficient by itself.

17. The device according to claim 14, further comprising means for maintaining an assigned transmission capacity until a further control device of the central station cancels the assigned transmission capacity.

18. An apparatus for dynamically varying, during an existing radio link, a transmission capacity based on a number of ATM cells, the apparatus being for use with a radio-communication system, a transmission being carried out in a radio-communication frame using time slots, the time slots representing multiples of a basic bit rate, the apparatus comprising:
   a storage arrangement for storing the ATM cells;
   a first counter arrangement for counting the ATM cells, the first counter arrangement being coupled to an input of the storage device and for providing a first ATM cell count;
   a second counter arrangement for counting the ATM cells, the second counter arrangement being coupled to an output of the storage arrangement and for providing a second ATM cell count;
   a comparator arrangement for comparing the first ATM cell count and the second ATM cell count and for providing a comparator output, the comparator arrangement being coupled to the first counter arrangement and the second counter arrangement;
   a bit rate altering arrangement being coupled to the storage arrangement and synchronizing an output of the storage arrangement; and
   a modem control arrangement for providing a control signal to the bit rate altering arrangement based on the comparator output and for transmitting a request signal for a different transmission capacity by communicating with a central station of the radio communication system via a radio-communication channel, the modem control arrangement being coupled to the comparator arrangement and to the bit rate altering arrangement.

19. An apparatus for dynamically varying, during an existing radio link, a transmission capacity based on a number of ATM cells, the apparatus being for use with a radio-communication system, a transmission being carried out in a radio-communication frame using time slots, the time slots representing multiples of a basic bit rate, the apparatus comprising:
   means for storing the ATM cells;
   means for providing a first ATM cell count;
   means for providing a second ATM cell count;
   means for comparing the first ATM cell count and the second ATM cell count and for providing a comparator output;
   means for altering a bit rate and for synchronizing an output of the storage arrangement; and
   means for providing modem control and for providing a control signal, based on the comparator output, to the means for altering the bit rate, and for transmitting a request signal for a different transmission capacity by communicating with a central station of the radio communication system via a radio-communication channel.

20. An apparatus for dynamically varying, during an existing radio link, a transmission capacity based on a number of ATM cells, the apparatus being for use with a radio-communication system, a transmission being carried out in a radio-communication frame using time slots, the time slots representing multiples of a basic bit rate, the apparatus comprising:
   storage arrangement to store the ATM cells;
   a first counter arrangement to count the ATM cells and to provide a first ATM cell count;
   a second counter arrangement to count the ATM cells and to provide a second ATM cell count;
   a comparator arrangement to compare the first ATM cell count and the second ATM cell count and to provide a comparator output;
   a bit rate altering arrangement being coupled to the storage arrangement and being operable to synchronize an output of the storage arrangement; and
   a modem control arrangement to provide a control signal to the bit rate altering arrangement based on the comparator output and to transmit a request signal for a different transmission capacity by communicating with a central station of the radio communication system via a radio-communication channel, the modem control arrangement being coupled to the comparator arrangement and to the bit rate altering arrangement.

21. The device according to claim 20, wherein the central station includes a processing arrangement to process the request signal of each of a plurality of radio-communication subscribers using a collision protocol.

22. The device according to claim 21, further comprising a maintaining arrangement to maintain an assigned increased transmission capacity for a set time period.

23. The device according to claim 21, further comprising a maintaining arrangement to maintain an assigned increased transmission capacity until the transmission capacity of a basic channel is again sufficient by itself.

24. The device according to claim 21, further comprising a maintaining arrangement to maintain an assigned transmission capacity until a further control device of the central station cancels the assigned transmission capacity.

25. A method for dynamically varying, during an existing radio link, a transmission capacity based on a number of ATM cells, the apparatus being for use with a radio-communication system, a transmission being carried out in a radio-communication frame using time slots, the time slots representing multiples of a basic bit rate, the method comprising:

storing the ATM cells;

providing a first ATM cell count and a second ATM cell count;

comparing the first ATM cell count and the second ATM cell count, and providing a comparator output;

altering a bit rate and synchronizing an output of a storage arrangement; and providing modem control and a control signal based on the comparator output for use in altering the bit rate, and transmitting a request signal for a different transmission capacity by communicating with a central station of the radio-communication system via a radio-communication channel.

26. A device for a radio-communication system, a transmission being carried out in a radio-communication frame using time slots, the time slots representing multiples of a basic bit rate, the device comprising:

a supplemental transmission arrangement to provide a supplemental transmission of at least one of packet-oriented data and cell-oriented data; and a dynamic assignment arrangement to dynamically assign a transmission capacity as a function of at least one of a traffic intensity in the transmitted time slots and a number of data packets or cells, the dynamic assignment being an assignment that is changeable during an existing radio link;

wherein a module to record and evaluate the data packets or cells, within a prescribed time period, and to output a request signal to increase the transmission capacity when a number of the data packets per time period exceeds a threshold value, is assigned to a radio-communication subscriber.

27. The device according to claim 26, wherein the radio-communication system includes point-to-multipoint connections between a central station and radio-communications subscribers.

28. The device according to claim 26, wherein at least one of the bit rate and a bandwidth of a transmitter of a radio-communication subscriber is switchable to change the transmission capacity.

29. The device according to claim 26, further comprising a multiplexer to separate a signal supplied by a radio interface of a radio-communication subscriber into data streams to transmit the time slots and ATM cells, and in a return direction, to compress the data streams sent by the radio-communication subscriber to transmit the time slots and the ATM cells into one data stream.

30. The device according to claim 26, wherein a basic channel for control cells is used to request the transmission capacity between a radio-communication subscriber and a central station.

31. The device according to claim 26, wherein a radio-communication multiframe is used to request the transmission capacity between a radio-communication subscriber and a central station.

* * * * *